United States Patent
Zhao et al.

(10) Patent No.: US 11,060,965 B2
(45) Date of Patent: Jul. 13, 2021

(54) MICROSCOPIC OBSERVATION SYSTEM WITH TEMPERATURE-PRESSURE-CONTROLLABLE SAMPLE CELL AND METHODS

(71) Applicant: SHANDONG UNIVERSITY, Shandong (CN)

(72) Inventors: Guoqun Zhao, Jinan (CN); Lei Zhang, Jinan (CN); Guilong Wang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 16/753,360

(22) PCT Filed: Mar. 18, 2019

(86) PCT No.: PCT/CN2019/078539
§ 371 (c)(1),
(2) Date: Apr. 3, 2020

(87) PCT Pub. No.: WO2019/184753
PCT Pub. Date: Oct. 3, 2019

(65) Prior Publication Data
US 2020/0333241 A1  Oct. 22, 2020

(30) Foreign Application Priority Data
Mar. 28, 2018 (CN) .......................... 201810266075.2

(51) Int. Cl.
*G01N 21/03* (2006.01)
*G02B 21/24* (2006.01)

(52) U.S. Cl.
CPC ..... *G01N 21/0303* (2013.01); *G01N 21/0317* (2013.01); *G01N 21/0332* (2013.01); *G02B 21/24* (2013.01)

(58) Field of Classification Search
CPC .......... G01N 21/0332; G01N 21/6458; G01N 21/0303; G01N 21/0317; G01N 21/532;
(Continued)

(56) References Cited

U.S. PATENT DOCUMENTS

| 5,003,174 A | * | 3/1991 | Datwyler ............... G01N 21/05 250/343 |
| 5,223,716 A | * | 6/1993 | Rossiter .................. G01N 21/09 250/343 |

(Continued)

FOREIGN PATENT DOCUMENTS

| CN | 101298032 A | 11/2008 |
| CN | 104100257 A | 10/2014 |

(Continued)

OTHER PUBLICATIONS

Jun. 19, 2019 International Search Report issued in Internaitonal Patent Applicaiton No. PCT/CN2019/078539.
(Continued)

*Primary Examiner* — Hoa Q Pham
(74) *Attorney, Agent, or Firm* — Oliff PLC

(57) ABSTRACT

A microscopic observation system with a temperature-pressure-controllable sample cell and methods. The system can be configured to perform common optical microscopic observation and polarizing microscopic observation. The system is composed of a visual autoclave, a temperature control component, a rapid cooling component, a pressure control component and an optical imaging system, and can be configured to observe an evolution process of microstructures of polymer materials in specific atmosphere and rapid temperature and pressure changing environments in a scale of 1 μm-1 cm. A novel characterization means for researching a condensed state evolution law of polymers in high-pressure environments, and also a new thought for deep reveal of the polymer crystallization mechanism and regu- (Continued)

lation of crystallization and phase separation behaviors of the polymer materials.

4 Claims, 4 Drawing Sheets

(58) Field of Classification Search
CPC ......... G01N 21/534; G01N 2021/6482; G01N 25/00; G02B 21/24
USPC ........... 356/36, 319, 244, 246, 326, 43, 904; 374/161, 20, 24, 5, 132; 73/53.01; 250/429; 359/368, 398
See application file for complete search history.

(56) References Cited

U.S. PATENT DOCUMENTS

| | | | |
|---|---|---|---|
| 7,593,101 B2* | 9/2009 | Yakimoski | G01N 21/0303 250/573 |
| 2005/0134845 A1* | 6/2005 | Bordelon | G01N 15/0227 356/336 |
| 2008/0202214 A1* | 8/2008 | Slater | G01N 25/147 73/53.01 |
| 2008/0202215 A1 | 8/2008 | Slater et al. | |
| 2020/0284725 A1* | 9/2020 | Zhao | G01N 21/0332 |
| 2020/0329289 A1* | 10/2020 | Kenaley | H04R 1/02 |

FOREIGN PATENT DOCUMENTS

| | | |
|---|---|---|
| CN | 104614290 A | 5/2015 |
| CN | 105424734 A | 3/2016 |
| CN | 106198609 A | 12/2016 |

OTHER PUBLICATIONS

Jun. 19, 2019 Written Opinion of International Searching Authority issued in International Patent Application No. PCT/CN2019/078539.

* cited by examiner

MICROSCOPIC OBSERVATION SYSTEM WITH TEMPERATURE-PRESSURE-CONTROLLABLE SAMPLE CELL AND METHODS

BACKGROUND

Technical Field

The present invention relates to a microscopic observation system configured to observe an evolution process of microstructures of polymer materials in specific atmosphere and rapid temperature and pressure changing environments.

Related Art

Microstructures of polymer materials not only depend on factors, such as molecular composition and chain segment structures, of the polymer materials themselves, but also depend on environmental change history experienced by the materials in evolution. People can control the microstructures of the materials by changing environmental factors where the materials are located so as to obtain excellent mechanical properties or special functions of polymer material products. The latest research finds that in specific atmosphere, when environmental pressure or temperature rapidly changes, the polymer materials show new microstructures and phase change behaviors that are not formed in conventional evolution processes. With popularization and development of industrial engineering application of the polymer materials, preparation and regulation of the polymer materials under different atmosphere, environmental pressure and environmental temperature conditions are required more and more frequently in many fields, such as preparation of novel light porous polymer materials, high-strength high-toughness crystalline polymer materials, and electrical property regulation of special polymers. Usually, the pressure and temperature changes in the above fields are relatively intense. In order to prepare these high-performance polymer materials and effectively regulate preparation processes and technological parameters, material structure evolution and phase change behaviors under special environments or tremendously changing working conditions must be studied from the angle of basic science. However, existing international research means and characterization instruments cannot directly monitor the behaviors of materials online. Microscopic characterization means with rapid-response of temperature and pressure are urgently needed to observe and research the microstructures and phase change behaviors in rapid changing processes of environmental pressure or temperature.

In the aspects of research means and observation systems for evolution of the microstructures of the polymer materials under special environments and working conditions, Prad Research and Development Ltd discloses a patent technology entitled 'High-pressure Cross-polar Microscopy Cell Having Adjustable Fluid Passage and Methods of Use' (Publication Number: CN 200810008638.4) in China in 2008. The high-pressure cross-polar microscopy cell of the disclosure includes a cell body, a fluid flow passage, and two window maintaining assemblies. The window maintaining assembly includes two or more light transmission windows. Gaps between the windows can be adjusted without changing crystal alignment of the windows. Fluid research utilizing properties of polarized light is performed while the thickness of a fluid sample is adjusted, and the adjustment of gaps is performed while the microscopy cell is pressurized. However, the microscopy cell has no temperature control function.

Southwest Petroleum University discloses a patent technology entitled 'High-temperature and High-pressure Microscopic Visualization Stratum Seepage Flow Simulation Experiment Device and Method in China in 2014 (Publication Number: CN 201410244772.X). The device includes a displacement system, a stratum seepage flow simulation system, a microscopic visualization system and a fluid analysis system. The systems can represent planar seepage flow characteristics and oil displacement mechanisms of a displacement process during exploitation of complex hydrocarbon reservoirs so as to realize continuous dynamic microscopic and visual observation of a seepage process. However, the systems are suitable for observation of a flowing process of fluid in core clamping pieces, do not involve sample cell cooling systems and are relatively singular in temperature control mode.

Harbin Engineering University discloses a patent technology entitled 'High-temperature and High-pressure Gas-liquid Two-phase Flow Visualization System in Interbank Narrow Space' in China in 2014 (Publication Number: CN 201410241897.7). According to the system of the patent, electric heating tube banks and a round cavity in a pressure bearing cylinder constitute an interbank narrow flow passage. Four groups of windows in a cross shape are formed in a cylinder wall of the pressure bearing cylinder. Window fastening frames are installed outside the windows through bolts. The system includes the four windows. Two high-speed cameras are used to face the windows at a 0-degree position and a 90-degree position correspondingly. However, the system does not include a pressure control device, and pressure in an inner cavity of the system cannot be measured in real time.

A granted patent (CN201610831430.7) filed by University of Science and Technology Beijing in 2016 discloses a visualization microscopic experimental device and method for displacing heavy oil by using high-temperature high-pressure carbon dioxide, which are applied to research of a precipitation law of asphaltene and influence of the precipitation law on a recovery ratio. The device includes a model clamper clamping a microscopic visual model, a displacement system, a back pressure system, a confining pressure system, a pressure monitoring system, a temperature control system and an image acquisition system, and oil-gas action change in a carbon dioxide displacement process is clearly observed. However, the device is designed for observing fluid and is not suitable for observing a static microscopic evolution process of the polymer materials.

The inventors found that the systems and methods disclosed in the mentioned patents not only have the problem of an insufficient function of temperature control or pressure control, but also are not suitable for detecting a material evolution process under rapid pressure and temperature change. This is because that how to prevent a critical opalescence phenomenon occurring in sample placing space is not considered in the design of the systems. The critical opalescence phenomenon is a strong light scattering phenomenon occurring when a substance, subjected to severe density fluctuation near a critical point, is illuminated by light. When pressure and temperature rapidly change, the critical opalescence phenomenon is prone to causing a blank screen in an imaging system and consequently causing loss of a part of images in the material evolution process. What's even more serious is that when a material system with a relatively high speed of structure evolution is observed, the blank screen phenomenon further causes total failure of the whole system.

SUMMARY

In order to solve the foregoing problems and realize whole-process monitoring of an evolution process of polymer materials in specific atmosphere and rapid temperature and pressure changing environments, the present invention discloses a microscopic observation system with a temperature-pressure-controllable sample cell and methods. The system can be configured to research nucleation and growth behaviors of supercritical fluid in the polymer materials, phase separation behaviors of polymer mixtures in small-molecular organic/inorganic solvents, isothermal/non-isothermal crystallization processes of the polymer materials in high-pressure atmosphere, melting processes of the polymer materials in the high-pressure atmosphere and the like. A novel characterization means is provided for researching a condensed state evolution law of polymers in environments with different atmospheres, different temperatures and different pressures, thus providing theoretical guidance for making a process scheme configured to regulate polymer crystallization and phase separation in actual production. The microscopic observation system can be used not only as a common optical microscopic observation system, but also as a polarizing microscopic observation system.

To achieve the foregoing objectives, the present invention adopts the following technical solution.

The present invention discloses a microscopic observation system with a temperature-pressure-controllable sample cell, including a visual autoclave, a temperature control component, a rapid cooling component, a pressure control component and an optical imaging system. The visual autoclave configured to place sample to be observed includes an autoclave body and an autoclave cover. The autoclave body is of a cylindrical structure with an opening on the top. An upper glass window, a breathable gasket and a lower glass window are sequentially pressed in the autoclave body from top to bottom by the autoclave cover. Sample placing space is formed among the upper glass window, the breathable gasket and the lower glass window. Light passing holes with central lines located on the same straight line are formed in a bottom of the autoclave body and the center of the autoclave cover. A light path system of the visual autoclave is composed of the light passing hole in the lower bottom of the autoclave body, the lower glass window, the breathable gasket, the upper glass window and the light passing hole in the center of the autoclave cover. Light can enter from the light passing hole in the center of the lower bottom of the autoclave body, then sequentially passes through the lower glass window, the center of the breathable gasket and the upper glass window and finally is emitted from the light passing hole in the center of the autoclave cover. The temperature control component is configured to control temperature of the visual autoclave. The rapid cooling component is configured to rapidly cool the visual autoclave. The pressure control component is configured to control pressure of the visual autoclave. The optical imaging system is configured to observe and record a condensed state evolution process of polymer materials.

Further, a first sealing ring is arranged on a matching surface between the upper glass window and the autoclave cover. The first sealing ring is configured to prevent high-pressure fluid in the autoclave body from flowing out from the light passing hole of the autoclave cover.

And/or, a second sealing ring is arranged on a matching surface between the autoclave body, and the autoclave cover. The second sealing ring is configured to prevent the high-pressure fluid in the autoclave body from flowing out from an interface between the autoclave cover and the autoclave body.

And/or, a third sealing ring is arranged on a matching surface between the lower glass window and the autoclave body. The third sealing ring is configured to prevent the high-pressure fluid in the autoclave body from flowing out from the light passing hole in the lower bottom of the autoclave body.

Resistant temperature of the first sealing ring, the second sealing ring and the third sealing ring should be higher than 200 éC.

Further, hardness of the breathable gasket is greater than that of the first sealing ring, the second sealing ring and the third sealing ring. The hardness of the breathable gasket is less than that of the upper glass window and the lower glass window so as to guarantee that the breathable gasket can effectively transmit sealing clamping force. The breathable gasket includes a middle portion and a peripheral portion. The middle portion is of a hollow structure and used as sample placing space. The peripheral portion is provided with ventilation grooves or notches, so that the sample placing space communicates with remaining space in the autoclave.

Thickness of the breathable gasket is less than 2 cm, i.e., a distance between opposite surfaces of the upper glass window and the lower glass window is less than 2 cm. Resistant temperature of the breathable gasket should be higher than that of all the sealing rings.

Further, the temperature control component includes a temperature controller, a heating element, a thermocouple and a signal cable. An input end of the temperature controller is connected with the thermocouple to acquire the temperature in the autoclave body, and an output end thereof is connected with the heating element through the signal cable. The temperature controller can output actually-measured temperature values to a computer through a data acquisition card, and the computer monitors and records temperature data.

Further, the rapid cooling component includes an autoclave cooling seat, a first stop valve, a liquid pump, a liquid thermostat and a cooling liquid pipeline. The autoclave cooling seat is of a cylindrical structure. The visual autoclave is installed in the autoclave cooling seat. A light passing hole allowing a light source to pass through is set in a base of the autoclave cooling seat. The light passing hole is coaxial with the light passing hole in the lower bottom of the autoclave body. The cooling liquid pipeline is distributed in the autoclave cooling seat. The cooling liquid pipeline, the liquid pump and the liquid thermostat form a circulation loop. The first stop valve is arranged on the circulation loop. A temperature control range of the liquid thermostat is −100° C.–100° C.

Further, the pressure control component includes a fluid source, a plunger pump, a second stop valve, a third stop valve, a drain valve, a pressure sensor and a pipeline. An outlet of the fluid source is connected with an inlet of the plunger pump. An outlet of the plunger pump is sequentially connected with the second stop valve, the pressure sensor and an inlet/outlet of the visual autoclave. The pipeline branch between the pressure sensor and the second stop valve is sequentially connected with the third stop valve and the drain valve. Fluid provided by the fluid source may be water, carbon dioxide, nitrogen, organic solvent and the like.

In the state that the second stop valve is opened and the third stop valve is closed, the plunger pump can control the pressure in the visual autoclave in two modes of constant pressure or constant flow. The pressure control range of the plunger pump is 0.1 MPa to 65 MPa. The drain valve can adjust a fluid drain speed. Pressure signals acquired by the pressure sensor are transmitted into a computer through a data acquisition card, and the computer monitors and records pressure data.

Further, the optical imaging system is formed by sequentially arranging a light source, a zoom focusing component and an image acquisition device. The light source is arranged outside the light passing hole of the autoclave cooling seat. The zoom focusing component is placed outside the light passing hole of the center of the autoclave cover. The zoom focusing component is connected with the image acquisition device. The image acquisition device is connected with a computer.

Preferably, the optical imaging system also includes a polarizer and an analyzer. The polarizer and the analyzer are optional components. If common optical observation needs to be realized, the polarizer and the analyzer are not required to be installed. If polarization microscopic observation needs to be realized, the polarizer and the analyzer are required to be installed.

Further, the light source may be, but not limited to, an LED light source. The type of the image acquisition device may be, but not limited to, a CMOS or a CCD. An adjustable range of an optical amplification factor of the zoom focusing component is 0.1-100.

Further, light transmittance of the sample is not less than 60%, the sample is in the shape of a thin sheet, and a thickness range of the thin sheet is $0.005 \approx m - 500 \approx m$.

The use methods of the present invention are as follows:

(I) Method for microscopically observing a sample in normal-pressure normal-temperature environments:

step (1), making the sample to be observed into a thin sheet;

step (2), placing the lower glass window inside the autoclave body, and placing the sample on an upper surface of the lower glass window;

step (3), turning off power supplies of the pressure control component, the temperature control component and the rapid cooling component in the system, and keeping in an off state;

step (4), adjusting an amplification factor of the zoom focusing component, focusing on a central layer of the sheet sample, adjusting intensity of a light source, and setting total shooting duration, exposure time and the like of the image acquisition device to prepare to shoot;

step (5), starting the image acquisition device to start shooting or recording, and storing images; and step (6), turning off power supplies of all the components in the system after the shooting is ended.

(II) Method for microscopically observing a sample in normal-pressure variable-temperature environments:

step (1), making the sample to be observed into a thin sheet;

step (2), sequentially placing the lower glass window and the breathable gasket inside the autoclave body, placing the sample into central space of the breathable gasket, and then sequentially placing the upper glass window and the autoclave cover on an upper surface of the breathable gasket;

step (3), closing all valves and turning off all power supplies in the pressure control component, and keeping in an off state;

step (4), setting temperature of the liquid thermostat, and keeping the liquid pump in a standby state;

step (5), according to demands, setting a temperature control program including target temperature and a target temperature rising rate in a heating process, target temperature and a target temperature decreasing rate in a cooling process and the like;

step (6), adjusting an amplification factor of the zoom focusing component, focusing on a central layer of the sheet sample, adjusting intensity of a light source, and setting total shooting duration, exposure time and the like of the image acquisition device to prepare to shoot;

step (7), running the temperature control program, and controlling temperature of the sample cell through a cooperation action of the temperature controller and the liquid pump;

step (8), starting the image acquisition device to perform shooting or recording at selected time, and storing images; and step (9), turning off power supplies of all the components in the system after the shooting is ended.

(III) Method for microscopically observing a sample in variable-pressure normal-temperature environments:

step (1), making the sample to be observed into a thin sheet;

step (2), sequentially placing the third sealing ring, the lower glass window and the breathable gasket inside the autoclave body, placing the sample into central space of the breathable gasket, then placing the upper glass window on an upper surface of the breathable gasket, installing the first sealing ring and the second sealing ring in a groove of the autoclave cover and a groove in an upper surface of the autoclave body respectively, and connecting the autoclave cover and the autoclave body through bolts and tightly squeezing all the parts;

step (3), opening the second stop valve and the third stop valve, starting the plunger pump, adjusting to a constant-flow mode, injecting specific fluid into the sample cell with a flow rate of 1 to 20 ml/min, and discharging air from the autoclave;

step (4), turning off power supplies of the temperature control component and a cooling control component, and keeping in an off state;

step (5), according to demands, setting a pressure control program of the specific fluid including target pressure and a target pressure increasing rate in a pressure increasing process, target pressure and a target pressure decreasing rate in a pressure decreasing process and the like;

step (6), adjusting an amplification factor of the zoom focusing component, focusing on a central layer of the sheet sample, adjusting intensity of a light source, and setting total shooting duration, exposure time and the like of the image acquisition device to prepare to shoot;

step (7), running the pressure control program, and controlling pressure of the specific fluid in the sample cell through a cooperation action of the plunger pump, the second stop valve and the third stop valve;

step (8), starting the image acquisition device to perform shooting or recording at selected time, and storing images; and step (9), turning off power supplies of all the components in the system after the shooting is ended.

(IV) Method for microscopically observing a sample in variable-pressure variable-temperature environments:

step (1), making the sample to be observed into a thin sheet;

step (2), sequentially placing the third sealing ring, the lower glass window and the breathable gasket inside the autoclave body, placing the sample into central space of the breathable gasket, then placing the upper glass window on an upper surface of the breathable gasket, installing the first sealing ring and the second sealing ring in a groove of the autoclave cover and a groove in an upper surface of the autoclave body respectively, and connecting the autoclave cover and the autoclave body through bolts and tightly squeezing all the parts;

step (3), opening the second stop valve and the third stop valve, starting the plunger pump, adjusting to a constant-flow mode, injecting specific fluid into the sample cell with a flow rate of 1 to 20 ml/min, and discharging air from the autoclave;

step (4), setting temperature of the liquid thermostat, and keeping the liquid pump in a standby state;

step (5), according to demands, setting a temperature control program including target temperature and a target temperature rising rate in a heating process, target temperature and a target temperature decreasing rate in a cooling process and the like;

step (6), according to demands, setting a pressure control program of the specific fluid including target pressure and a target pressure increasing rate in a pressure increasing process, target pressure and a target pressure decreasing rate in a pressure decreasing process and the like;

step (7), adjusting an amplification factor of the zoom focusing component, focusing on a central layer of the sheet sample, adjusting intensity of a light source, and setting total shooting duration, exposure time and the like of the image acquisition device to prepare to shoot;

step (8), simultaneously running the temperature control program and the pressure control program, controlling temperature of the sample cell through a cooperation action of the temperature controller and the liquid pump, and controlling pressure of the specific fluid in the sample cell through a cooperation action of the plunger pump, the second stop valve and the third stop valve;

step (9), starting the image acquisition device to perform shooting or recording at selected time, and storing images; and step (10), turning off power supplies of all the components in the system after the shooting is ended.

The present invention has the beneficial effects:

Compared with a common optical microscope with a hot stage and a polarizing microscope with a hot stage, the system according to the present invention can be configured to observe the evolution process of microstructures of the polymer materials in specific atmosphere and rapid temperature and pressure changing environments. The visual system given by the present invention provides a novel characterization means for researching the condensed state evolution law of the polymers in high-pressure atmosphere environments, which can provide a process scheme for regulating polymer crystallization and phase separation and realize decoupling research of cohesive energy and segmental motion capacity in a polymer crystallization theory, thus provide a new thought for further and deep reveal of the polymer crystallization mechanism.

BRIEF DESCRIPTION OF THE DRAWINGS

The accompanying drawings constituting a part of this application are used for providing further understanding for this application. Exemplary embodiments of this application and descriptions thereof are used for explaining this application and do not constitute an improper limitation to this application.

In the diagram, 1 a light source; 2 a polarizer; 3 an analyzer; 4 a zoom focusing component; 5 a high-speed image acquisition device; 6 an autoclave body; 7 an autoclave cover; 8 an upper glass window; 9 a lower glass window; 10 a bolt; 11 a first sealing ring; 12 a second sealing ring; 13 a third sealing ring; 14 a breathable gasket; 15 a temperature controller; 16 a heating element 17 a thermocouple; 18 a signal cable; 19 sample placing space; 20 a data acquisition card; 21 a computer; 22 an autoclave cooling seat 23 a first stop valve; 24 a liquid pump; 25 a liquid thermostat; 26 a cooling liquid pipeline; 27 a fluid source; 28 a plunger pump; 29 a second stop valve; 30 a third stop valve; 31 a drain valve; 32 a pressure sensor; and 33 a pipeline.

Figure 2:
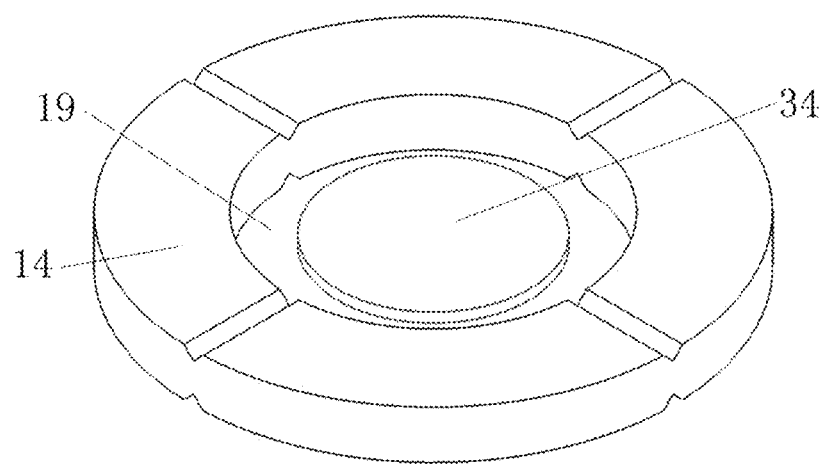

FIG. 2 is a schematic structural diagram of the breathable gasket according to the present invention, where 34 denotes a sheet-shaped sample.

Figure 3:
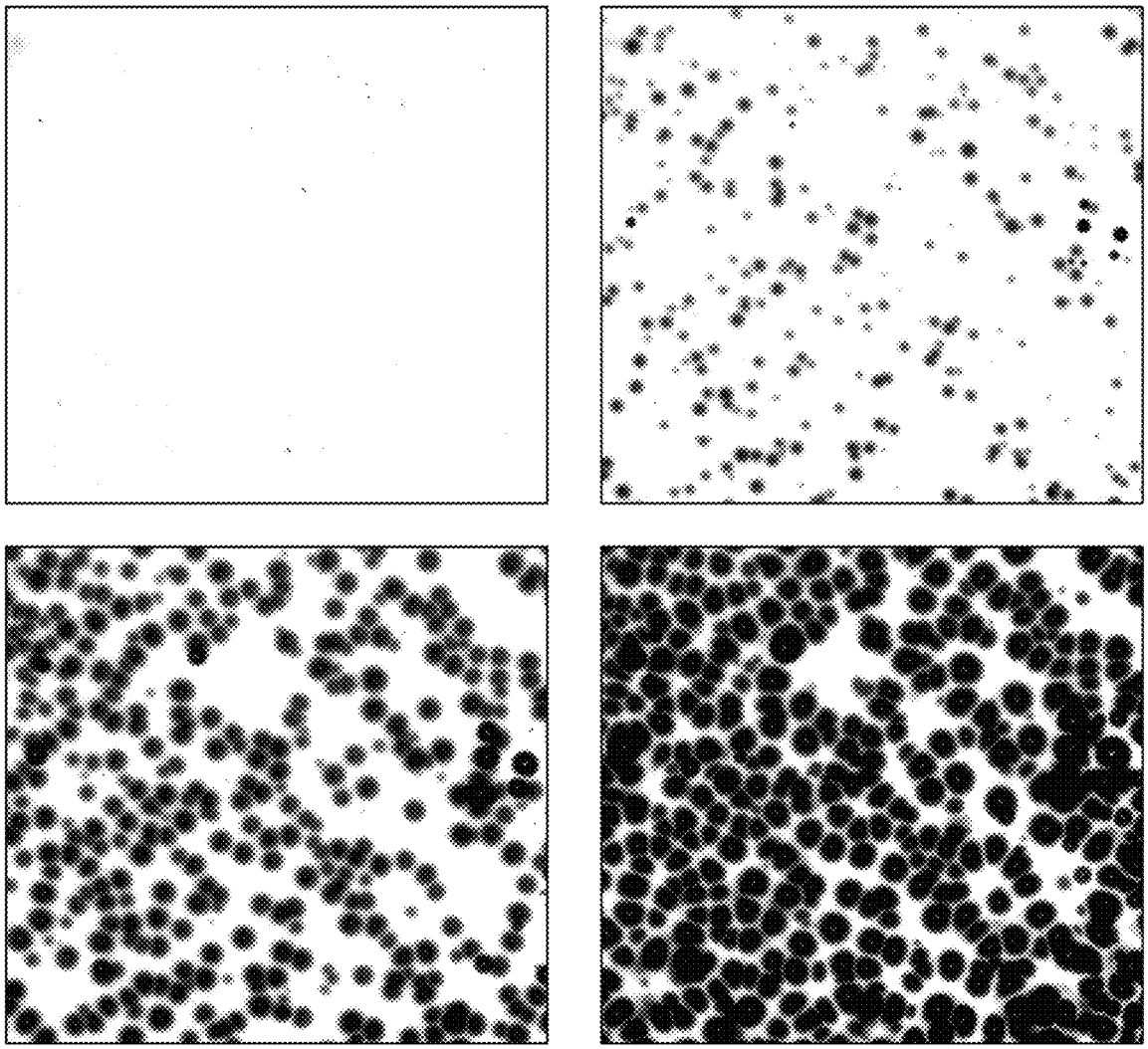

FIG. 3 is a phase separation process of a carbon dioxide/polymethyl methacrylate (PMMA) system in a rapid pressure relief process observed by a common optical microscopic system according to the present invention.

Figure 4:
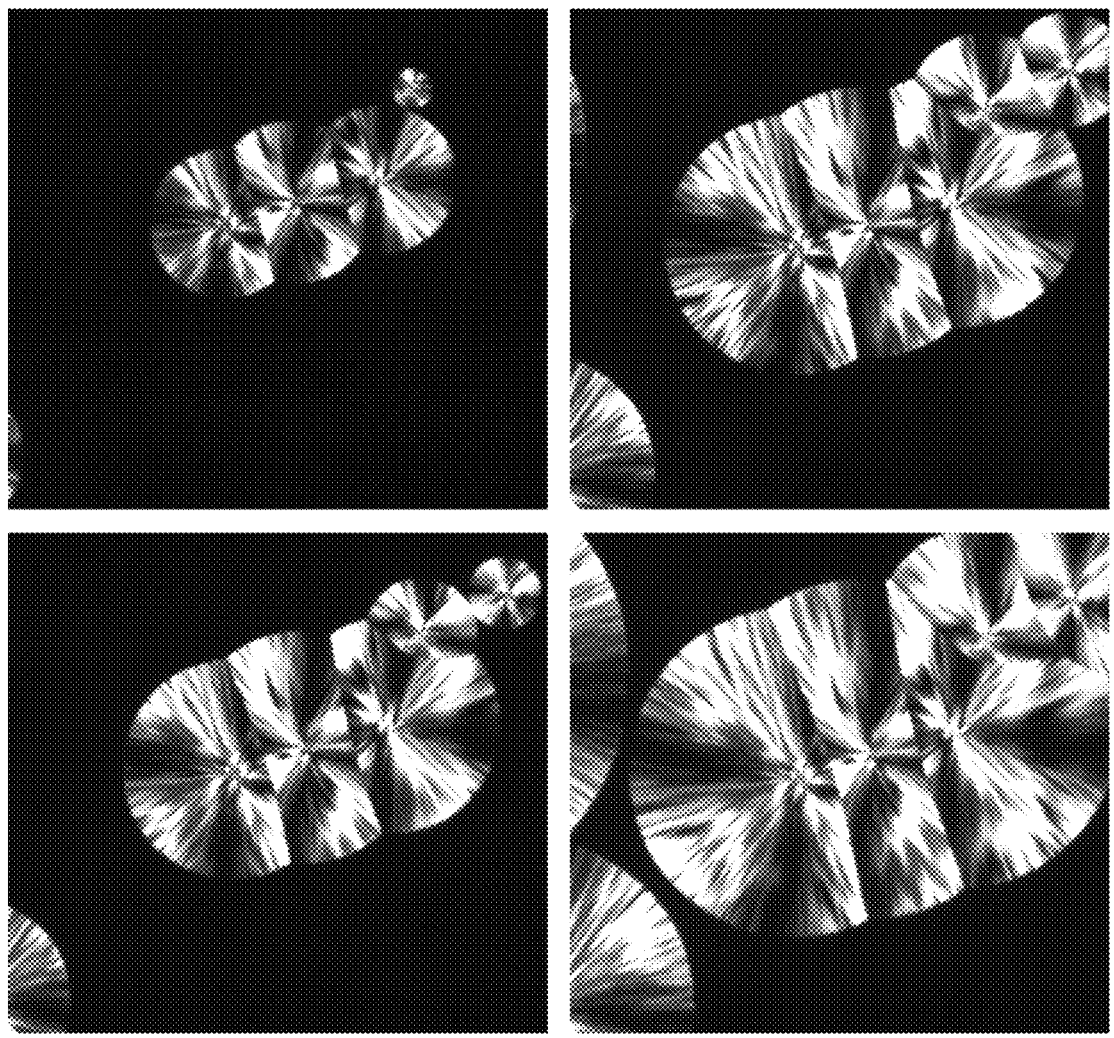

FIG. 4 is a crystallization process of PLLA in 6.9 MPa carbon dioxide observed by a polarizing microscopic system according to the present invention.

DETAILED DESCRIPTION

It should be noted that the following detailed descriptions are all exemplary and are intended to provide a further understanding of this application. Unless otherwise specified, all technical and scientific terms used herein have the same meaning as commonly understood by those of ordinary skill in the art to which this application belongs.

It should be noted that terms used herein are only for describing specific implementations and are not intended to limit exemplary implementations according to this application. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

Rapid cooling of a "rapid cooling component" described in the present invention means that a temperature decreasing rate of a sample cell in a cooling process may maximally reach 6 éC/s.

High pressure of an "autoclave" in the present invention means that an internal gas pressure value which can be borne by an autoclave body after sealing may reach 30 MPa. In a pressure relief process, pressure of the autoclave can be relieved to atmospheric pressure, and a pressure relief rate can reach 20 MPa/s.

The present invention is further described below with reference to the accompanying drawings and embodiments.

Figure 1:
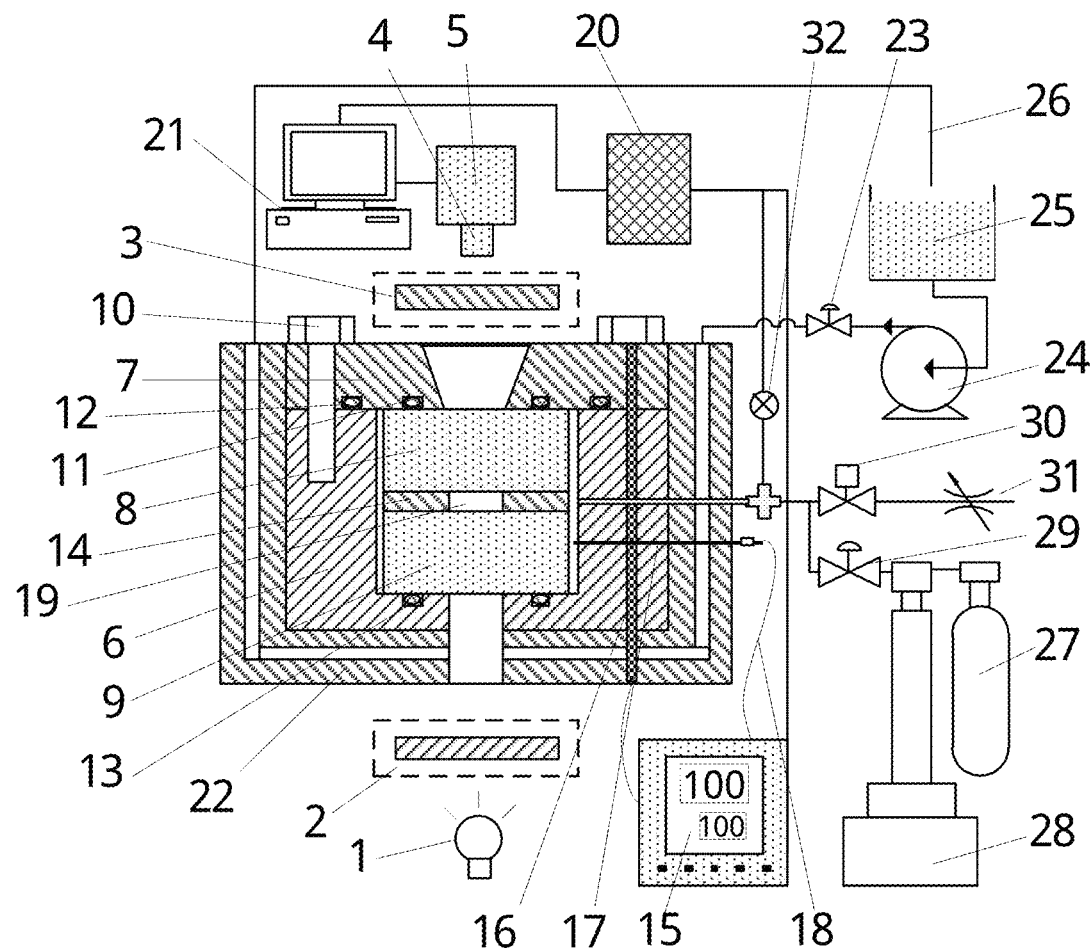
FIG. 1 is a schematic diagram of a microscopic observation system with a temperature-pressure-controllable sample cell according to the present invention.

As shown in FIG. 1, a microscopic observation system with a temperature-pressure-controllable sample cell disclosed by the present invention includes a visual autoclave, a temperature control component, a rapid cooling component, a pressure control component and an optical imaging system. The visual autoclave is configured to place a sample to be observed. The temperature control component is configured to control temperature of the visual autoclave. The rapid cooling component is configured to rapidly cool the visual autoclave, and the pressure control component is configured to control pressure of the visual autoclave. The optical imaging system is configured to observe and record a condensed state evolution process of polymer materials.

The visual autoclave includes an autoclave body 6, an autoclave cover 7, an upper glass window 8, a lower glass window 9, bolts 10, a first sealing ring 11, a second sealing ring 12, a third sealing ring 13 and a breathable gasket 14. The lower glass window 9, the breathable gasket 14 and the upper glass window 8 are sequentially installed in the autoclave body 6. The autoclave cover 7 and the autoclave body 6 are connected by the bolts 10 and all the parts are tightly squeezed. The first sealing ring 11 is arranged on a matching surface between the upper glass window and the autoclave cover, and configured to prevent high-pressure fluid in the autoclave body from flowing out from a light passing hole of the autoclave cover. The second sealing ring 12 is arranged on a matching surface between the autoclave body and the autoclave cover to preventing the high-pressure fluid in the autoclave body from flowing out from an interface between the autoclave cover and the autoclave body. The third sealing ring 13 is arranged on a matching surface between the lower glass window and the autoclave body, and configured to prevent the high-pressure fluid in the autoclave body from flowing out from a light passing hole in a lower bottom of the autoclave body. Resistant temperature of the first sealing ring 11, the second sealing ring 12 and the third sealing ring 13 should be higher than 200 éC to realize sealing of the visual autoclave. The light passing hole is formed in the lower bottom of the autoclave body 6 and the center of the autoclave cover 7. Light can enter from the light passing hole in the center of the lower bottom of the autoclave body 6, then sequentially passes through the lower glass window 9, the center of the breathable gasket 14 and the upper glass window 8 and finally is emitted from the light passing hole in the center of the autoclave cover 7. Space enclosed by the lower glass window 9, the breathable gasket 14 and the upper glass window 8 is configured to place an observed sample.

Further, the breathable gasket 14 includes a middle portion and a peripheral portion. The middle portion is of a hollow structure and used as sample placing space, and the peripheral portion is provided with ventilation grooves or notches, so that the sample placing space communicates with remaining space in the autoclave. A schematic outline diagram of the breathable gasket is shown in FIG. 2. A way shown in FIG. 2 may be selected for an arrangement way of the ventilation grooves, where a plurality of ventilation grooves is set in the peripheral portion in a radial direction. The number of the ventilation grooves is not limited. The ventilation grooves may be evenly distributed or unevenly distributed. Further preferably, the thickness of the breathable gasket 14 may be designed to be 1 cm, i.e., a distance between opposite surfaces of the upper glass window 8 and the lower glass window 9 is 1 cm.

Further, the autoclave body 6 and the autoclave cover 7 of the visual autoclave may be made of, but not limited to, stainless steel. The first sealing ring 11, the second sealing ring 12 and the third sealing ring 13 may be made of, but not limited to, fluororubber. The breathable gasket 14 may be made of, but not limited to, polytetrafluoroethylene. The upper glass window 8 and the lower glass window 9 may be made of, but not limited to, sapphire and high-purity quartz. An autoclave cooling seat 22 may be made of, but not limited to, aluminum alloy.

The temperature control component includes a temperature controller 15, a heating element 16, a thermocouple 17 and a signal cable 18. An input end of the temperature controller 15 is connected with the thermocouple 17 to acquire temperature of internal space of the autoclave body 6, and an output end thereof is connected with the heating element 16 through the signal cable 18. The temperature controller 15 can output actually-measured temperature values to a computer 21 through a data acquisition card 20. The computer 21 monitors and records temperature data.

The rapid cooling component includes the autoclave cooling seat 22, a first stop valve 23, a liquid pump 24, a liquid thermostat 25 and a cooling liquid pipeline 26. The visual autoclave is installed in the autoclave cooling seat 22. A cooling pipeline is distributed in the autoclave cooling seat. An outlet of the liquid thermostat 25 is connected with an inlet of the liquid pump 24. A n outlet of the liquid pump 24 is connected with the first stop valve 23 and an inlet of the autoclave cooling seat 22. An outlet of the autoclave cooling seat 22 is connected with an inlet of the liquid thermostat 25. Further, a temperature control range of the liquid thermostat 25 in the present embodiment is −100 éC-100 éC.

Specifically, the autoclave cooling seat 22 is of a cylindrical structure. The visual autoclave is installed in the autoclave cooling seat 22. A light passing hole allowing a light source to pass through is formed in a base of the autoclave cooling seat 22. The light passing hole is coaxial with the light passing hole in the lower bottom of the autoclave body 6.

The pressure control component includes a fluid source 27, a plunger pump 28, a second stop valve 29, a third stop valve 30, a drain valve 31, a pressure sensor 32 and a pipeline 33. An outlet of the fluid source 27 is connected with an inlet of the plunger pump 28. An outlet of the plunger pump 28 is sequentially connected with the second stop valve 29, the pressure sensor 32 and an inlet/outlet of the visual autoclave. A pipeline branch between the pressure sensor 32 and the second stop valve 29 is sequentially connected with the third stop valve 30 and the drain valve 31. The fluid source 27 may be water, carbon dioxide, nitrogen, organic solvent and the like. In the state that the second stop valve 29 is opened and the third stop valve 30 is closed, the plunger pump 28 can control pressure in the visual autoclave in two modes of constant pressure or constant flow.

Further preferably, a pressure control range of the plunger pump 28 may be 0.1 MPa to 65 MPa. Pressure signals acquired by the pressure sensor 32 are transmitted into the computer 21 through a data acquisition card 20. The computer 21 monitors and records data.

The optical imaging system is formed by sequentially arranging a light source 1, a polarizer 2, an analyzer 3, a zoom focusing component 4 and a high-speed image acquisition device 5. The light source 1 is arranged outside the light passing hole of the autoclave cooling seat 22. The zoom focusing component 4 is placed outside the light passing hole in the center of the autoclave cover 7. The zoom focusing component 4 is connected with the image acquisition device 5, and the image acquisition device 5 is connected with the computer 21.

The light source 1 enters from the light passing hole of the autoclave cooling seat 22, penetrates through the light passing hole in the center of the lower bottom of the autoclave body 6, sequentially passes through the lower glass window 9, the center of the breathable gasket 14 and the upper glass window 8. Finally the light is emitted from the light passing hole in the center of the autoclave cover 7, and received by the zoom focusing component 4.

The polarizer 2 and the analyzer 3 are optional components. If common optical observation needs to be realized, the two lenses are not required to be installed. If polarization microscopic observation needs to be realized, the polarizer 2 and the analyzer 3 are required to be installed.

Further, the light source 1 may be, but not limited to, an LED white light source. The type of the high-speed image acquisition device 5 may be, but not limited to, a CMOS. An adjustable range of an optical amplification factor of the zoom focusing component 4 is 0.1-100.

Further preferably, light transmittance of the sample is not less than 60%. The sample is in the shape of a thin sheet 34. A thickness range of the thin sheet may be 0.005≈m–500≈m.

Detailed description is made through several embodiments below:

Embodiment 1

A phase separation process of a carbon dioxide/polymethyl methacrylate (PMMA) system in a rapid pressure relief process is observed by using a common optical microscopic function:

Step (1), PMMA is made into a thin sheet with a thickness being 200≈m.

Step (2), the third sealing ring 13, the lower glass window 9 and the breathable gasket 14 are sequentially placed inside the autoclave body 6. The sample 34 is placed into central space 19 of the breathable gasket 14. Then the upper glass window 8 is placed on an upper surface of the breathable gasket 14. The first sealing ring 11 and the second sealing ring 12 are installed in a groove of the autoclave cover 7 and a groove in an upper surface of the autoclave body 6, respectively. The autoclave cover 7 and the autoclave body 6 are connected through the bolts 10 and all the parts are tightly squeezed.

Step (3), the second stop valve 29 and the third stop valve 30 are opened. The plunger pump 28 is started, and is adjusted to a constant-flow mode. Carbon dioxide is injected into the sample cell with a flow rate of 1 to 20 ml/min. Air in the autoclave is discharged.

Step (4), the temperature controller 15 is turned on. The sample cell is heated to a certain temperature higher than a glass-transition temperature of the PMMA.

Step (5), the third stop valve 30 is closed. The plunger pump 28 is adjusted to a constant-pressure mode. Carbon dioxide continues to be injected into the sample cell till a set pressure value (14 MPa for this embodiment) is reached.

Step (6), when temperature and pressure of the sample cell are stabilized at set values, timing of 1 hour is started.

Step (7), in a timing process, the amplification factor of the zoom focusing component 4 is adjusted. A central layer of the sheet sample is focused on. Intensity of the light source 1 is adjusted. Total shooting duration, exposure time and the number of shot images of the image acquisition device 5 are set to prepare to shoot.

Step (8), when timing is ended, the second stop valve 29 is closed. The image acquisition device 5 is started while the third stop valve 30 is opened, and continuous shooting or recording is started. In this process, the pressure of the sample cell changes intensely with a changing rate being about 1000 MPa/min.

Step (9), shooting is ended, and the shot images are stored as shown in FIG. 3. The temperature controller 15 is turned off, and the plunger pump 28 is shut down.

Step (10), the first stop valve 23 is opened. The liquid pump 24 is started. The sample cell is cooled with normal-temperature water.

Embodiment 2

A crystallization process of poly(L-lactide) (PLLA) in high-pressure carbon dioxide is observed by adopting a polarizing microscopic function:

Step (1), PLLA is made into a thin sheet with a thickness being 15≈m.

Step (2), the third sealing ring 13, the lower glass window 9 and the breathable gasket 14 are sequentially placed inside the autoclave body. The sample 34 is placed into the central space 19 of the breathable gasket 14. Then the upper glass window 8 is placed on the upper surface of the breathable gasket 14. The first sealing ring 11 and the second sealing ring 12 are respectively installed in the groove of the autoclave cover 7 and the groove in the upper surface of the autoclave body 6. The autoclave cover 7 and the autoclave body 6 are connected through the bolts 10 and all the parts are tightly squeezed.

Step (3), the second stop valve 29 and the third stop valve 30 are opened. The plunger pump 28 is started, and is adjusted to the constant-flow mode. Carbon dioxide is injected into the sample cell with a flow rate of 1 to 20 ml/min. Air in the autoclave is discharged.

Step (4), the temperature controller 15 is turned on. The sample cell is heated to a PLLA melting point to enable the PLLA to be in a molten state.

Step (5), the third stop valve 30 is closed. The plunger pump 28 is adjusted to the constant-pressure mode. Carbon dioxide continues to be injected into the sample cell till a set pressure value is reached.

Step (6), when the temperature and pressure of the sample cell are stabilized at set values, timing of 30 min is started.

Step (7), in a timing process, the amplification factor of the zoom focusing component 4 is adjusted. A central layer of the sheet sample is focused on. The intensity of the light source 1 is adjusted. The polarizer 2 is additionally installed between the light source 1 and a light passing hole in a lower bottom of the sample cell. The analyzer 3 is additionally installed between the image acquisition device 5 and a light passing hole in an upper cover of the sample cell. The analyzer 3 is rotated until light in the view of the image acquisition device 5 is completed eliminated. Exposure time of the image acquisition device 5 is set to prepare to shoot.

Step (8), when timing is ended, a temperature setting value of the temperature controller 15 is adjusted to a PLLA crystallization temperature. The first stop valve 23 is opened and the liquid pump 24 is started simultaneously. The visual autoclave is rapidly cooled to the PLLA crystallization temperature with low-temperature cooling liquid. In this process, the temperature changes intensely with a temperature decreasing rate being about 6 éC/s.

Step (9), when the crystallization temperature is reached, timing is started. Shooting is performed and images are stored. The shot images are as shown in FIG. 4.

Step (10), after crystallization is finished, the temperature controller 15 is turned off. The plunger pump 28 is shut down. The image acquisition device 5 is turned off.

Step (11), the first stop valve 23 is opened. The liquid pump 24 is started. The sample cell is cooled to room temperature.

The specific implementations of the present invention are described above with reference to the accompanying drawings, but are not intended to limit the protection scope of the present invention. Those skilled in the art should understand that various modifications or deformations may be made without creative efforts based on the technical solutions of the present invention, and such modifications or deformations shall fall within the protection scope of the present invention.

What is claimed is:

1. A method for observing a sample in normal-pressure normal-temperature environments by utilizing a microscopic observation system with a temperature-pressure-controllable sample cell, the microscopic observation system including a visual autoclave, a temperature control component, a rapid cooling component, a pressure control component and an optical imaging system; the visual autoclave configured to place a sample to be observed, comprising an autoclave body and an autoclave cover, the autoclave body being of a cylindrical structure with an opening on the top, and an upper glass window, a breathable gasket and a lower glass window being sequentially pressed in the autoclave body from top to bottom by the autoclave cover, sample placing space being formed among the upper glass window, the breathable gasket and the lower glass window, light passing holes with central lines located on a same straight line being formed in a bottom of the autoclave body and a center of the autoclave cover, a visual autoclave light path system being composed of the light passing hole in the bottom of the autoclave body, the lower glass window, the breathable gasket, the upper glass window and the light passing hole in the center of the autoclave cover, light being allowed to enter from the light passing hole in a center of the bottom of the autoclave body, then to sequentially pass through the lower glass window, a center of the breathable gasket and the upper glass window and finally to be emitted from the light passing hole in the center of the autoclave cover; the temperature control component is configured to control temperature of the visual autoclave; the rapid cooling component is configured to rapidly cool the visual autoclave; the pressure control component is configured to control pressure of the visual autoclave; the optical imaging system is configured to observe and record a condensed state evolution process of the sample, the method comprising:

step I, making the sample to be observed into a thin sheet;
step II, placing the lower glass window inside the autoclave body, and placing the sample on an upper surface of the lower glass window;
step III, turning off power supplies of the pressure control component, the temperature control component and the rapid cooling component in the system, and keeping in an off state;
step IV, adjusting an amplification factor of the zoom focusing component, focusing on a central layer of the sheet sample, adjusting intensity of the light source, and setting total shooting duration, exposure time and the like of the image acquisition device to prepare for shooting;
step V, starting the image acquisition device to start shooting or recording, and storing images; and
step VI, turning off power supplies of all the components in the system after the shooting is ended.

2. A method for observing a sample in variable-pressure normal-temperature environments by utilizing a microscopic observation system with a temperature-pressure-controllable sample cell, the microscopic observation system including a visual autoclave, a temperature control component, a rapid cooling component, a pressure control component and an optical imaging system; the visual autoclave configured to place a sample to be observed, comprising an autoclave body and an autoclave cover, the autoclave body being of a cylindrical structure with an opening on the top, and an upper glass window, a breathable gasket and a lower glass window being sequentially pressed in the autoclave body from top to bottom by the autoclave cover, sample placing space being formed among the upper glass window, the breathable gasket and the lower glass window, light passing holes with central lines located on a same straight line being formed in a bottom of the autoclave body and a center of the autoclave cover, a visual autoclave light path system being composed of the light passing hole in the bottom of the autoclave body, the lower glass window, the breathable gasket, the upper glass window and the light passing hole in the center of the autoclave cover, light being allowed to enter from the light passing hole in a center of the bottom of the autoclave body, then to sequentially pass through the lower glass window, a center of the breathable gasket and the upper glass window and finally to be emitted from the light passing hole in the center of the autoclave cover; the temperature control component is configured to control temperature of the visual autoclave; the rapid cooling component is configured to rapidly cool the visual autoclave; the pressure control component is configured to control pressure of the visual autoclave; the optical imaging system is configured to observe and record a condensed state evolution process of the sample, the method comprising:

step I, making the sample to be observed into a thin sheet;
step II, sequentially placing the third sealing ring, the lower glass window and the breathable gasket inside the autoclave body, placing the sample into central space of the breathable gasket, then placing the upper glass window on an upper surface of the breathable gasket, installing the first sealing ring and the second sealing ring in a groove of the autoclave cover and a groove in an upper surface of the autoclave body respectively, and connecting the autoclave cover and the autoclave body through bolts and tightly squeezing all the parts;
step III, opening the second stop valve and the third stop valve, starting the plunger pump, adjusting to a constant-flow mode, injecting specific fluid into the sample cell with a flow rate of 1 to 20 ml/min, and discharging air from the autoclave;
step IV, turning off power supplies of the temperature control component and a cooling control component, and keeping in an off state;
step V, according to demands, setting a pressure control program of the specific fluid comprising target pressure and a target pressure increasing rate in a pressure increasing process, target pressure and a target pressure decreasing rate in a pressure decreasing process and the like;
step VI, adjusting an amplification factor of the zoom focusing component, focusing on a central layer of the sheet sample, adjusting intensity of the light source, and setting total shooting duration, exposure time and the like of the image acquisition device to prepare for shooting;
step VII, running the pressure control program, and controlling pressure of the specific fluid in the sample cell through a cooperation action of the plunger pump, the second stop valve and the third stop valve;
step VIII, starting the image acquisition device to perform shooting or recording at selected time, and storing images; and
step VIIII, turning off power supplies of all the components in the system after the shooting is ended.

3. A method for microscopically observing a sample in variable-pressure variable-temperature environments by utilizing a microscopic observation system with a temperature-pressure-controllable sample cell, the microscopic observation system including a visual autoclave, a temperature control component, a rapid cooling component, a pressure control component and an optical imaging system; the visual autoclave configured to place a sample to be observed, comprising an autoclave body and an autoclave cover, the autoclave body being of a cylindrical structure with an opening on the top, and an upper glass window, a breathable gasket and a lower glass window being sequentially pressed in the autoclave body from top to bottom by the autoclave cover, sample placing space being formed among the upper glass window, the breathable gasket and the lower glass window, light passing holes with central lines located on a same straight line being formed in a bottom of the autoclave body and a center of the autoclave cover, a visual autoclave light path system being composed of the light passing hole in the bottom of the autoclave body, the lower glass window, the breathable gasket, the upper glass window and the light passing hole in the center of the autoclave cover, light being allowed to enter from the light passing hole in a center of the bottom of the autoclave body, then to sequentially pass through the lower glass window, a center of the breathable gasket and the upper glass window and finally to be emitted from the light passing hole in the center of the autoclave cover; the temperature control component is configured to control temperature of the visual autoclave; the rapid cooling component is configured to rapidly cool the visual autoclave; the pressure control component is configured to control pressure of the visual autoclave; the optical imaging system is configured to observe and record a condensed state evolution process of the sample, the method comprising:

step I, making the sample to be observed into a thin sheet;

step II, sequentially placing the third sealing ring, the lower glass window and the breathable gasket inside the autoclave body, placing the sample into central space of the breathable gasket, then placing the upper glass window on an upper surface of the breathable gasket, installing the first sealing ring and the second sealing ring in a groove of the autoclave cover and a groove in an upper surface of the autoclave body respectively, and connecting the autoclave cover and the autoclave body through bolts and tightly squeezing all the parts;

step III, opening the second stop valve and the third stop valve, starting the plunger pump, adjusting to a constant-flow mode, injecting specific fluid into the sample cell with a flow rate of 1 to 20 ml/min, and discharging air from the autoclave;

step IV, setting temperature of the liquid thermostat, and keeping the liquid pump in a standby state;

step V, according to demands, setting a temperature control program comprising target temperature and a target temperature rising rate in a heating process, target temperature and a target temperature decreasing rate in a cooling process and the like;

step VI, according to demands, setting a pressure control program of the specific fluid comprising target pressure and a target pressure increasing rate in a pressure increasing process, target pressure and a target pressure decreasing rate in a pressure decreasing process and the like;

step VII, adjusting an amplification factor of the zoom focusing component, focusing on a central layer of the sheet sample, adjusting intensity of the light source, and setting total shooting duration, exposure time and the like of the image acquisition device to prepare for shooting;

step VIII, simultaneously running the temperature control program and the pressure control program, controlling temperature of the sample cell through a cooperation action of the temperature controller and the liquid pump, and controlling pressure of the specific fluid in the sample cell through a cooperation action of the plunger pump, the second stop valve and the third stop valve;

step VIIII, starting the image acquisition device to perform shooting or recording at selected time, and storing images; and step X, turning off power supplies of all the components in the system after the shooting is ended.

4. A method for microscopically observing a sample in normal-pressure variable-temperature environments by utilizing a microscopic observation system with a temperature-pressure-controllable sample cell, the microscopic observation system including a visual autoclave, a temperature control component, a rapid cooling component, a pressure control component and an optical imaging system; the visual autoclave configured to place a sample to be observed, comprising an autoclave body and an autoclave cover, the autoclave body being of a cylindrical structure with an opening on the top, and an upper glass window, a breathable gasket and a lower glass window being sequentially pressed in the autoclave body from top to bottom by the autoclave cover, sample placing space being formed among the upper glass window, the breathable gasket and the lower glass window, light passing holes with central lines located on a same straight line being formed in a bottom of the autoclave body and a center of the autoclave cover, a visual autoclave light path system being composed of the light passing hole in the bottom of the autoclave body, the lower glass window, the breathable gasket, the upper glass window and the light passing hole in the center of the autoclave cover, light being allowed to enter from the light passing hole in a center of the bottom of the autoclave body, then to sequentially pass through the lower glass window, a center of the breathable gasket and the upper glass window and finally to be emitted from the light passing hole in the center of the autoclave cover; the temperature control component is configured to control temperature of the visual autoclave; the rapid cooling component is configured to rapidly cool the visual autoclave; the pressure control component is configured to control pressure of the visual autoclave; the optical imaging system is configured to observe and record a condensed state evolution process of the sample, the method comprising:

step I, making the sample to be observed into a thin sheet;

step II, sequentially placing the lower glass window and the breathable gasket inside the autoclave body, placing the sample into central space of the breathable gasket, and then sequentially placing the upper glass window and the autoclave cover on an upper surface of the breathable gasket;

step III, closing all valves and turning off all power supplies in the pressure control component, and keeping in an off state;

step IV, setting temperature of the liquid thermostat, and keeping the liquid pump in a standby state;

step V, according to demands, setting a temperature control program comprising target temperature and a target temperature rising rate in a heating process, target temperature and a target temperature decreasing rate in a cooling process and the like;

step VI, adjusting an amplification factor of the zoom focusing component, focusing on a central layer of the sheet sample, adjusting intensity of the light source, and setting total shooting duration, exposure time and the like of the image acquisition device to prepare for shooting;

step VII, running the temperature control program, and controlling temperature of the sample cell through a cooperation action of the temperature controller and the liquid pump;

step VIII, starting the image acquisition device to perform shooting or recording at selected time, and storing images; and step VIIII, turning off power supplies of all the components in the system after the shooting is ended.

* * * * *